United States Patent [19]
Dale

[11] 3,730,472
[45] May 1, 1973

[54] QUICK MOUNT

[76] Inventor: Warren R. Dale, Wever, Iowa 52658

[22] Filed: July 21, 1971

[21] Appl. No.: 164,696

[52] U.S. Cl.....................................248/300, 248/57
[51] Int. Cl.................................................F16l 3/22
[58] Field of Search......................248/216, 221, 300, 248/65, 68, 70, 71

[56] References Cited

UNITED STATES PATENTS 3,021,103  2/1962  Beyerle....................................248/57
1,464,620  8/1923  Tefft.......................................248/221
3,104,087  9/1963  Budnick et al......................248/216 X

FOREIGN PATENTS OR APPLICATIONS 121,430  5/1946  Australia.............................248/300

Primary Examiner—J. Franklin Foss

[57] ABSTRACT

A holder that is readily attachable to a building construction and which is adaptable for mounting plumbing pipes or electrical components, the device consisting of two sheet metal straps that may be variously bent and variously attachable together or used alone to form a rigid holder.

1 Claim, 4 Drawing Figures

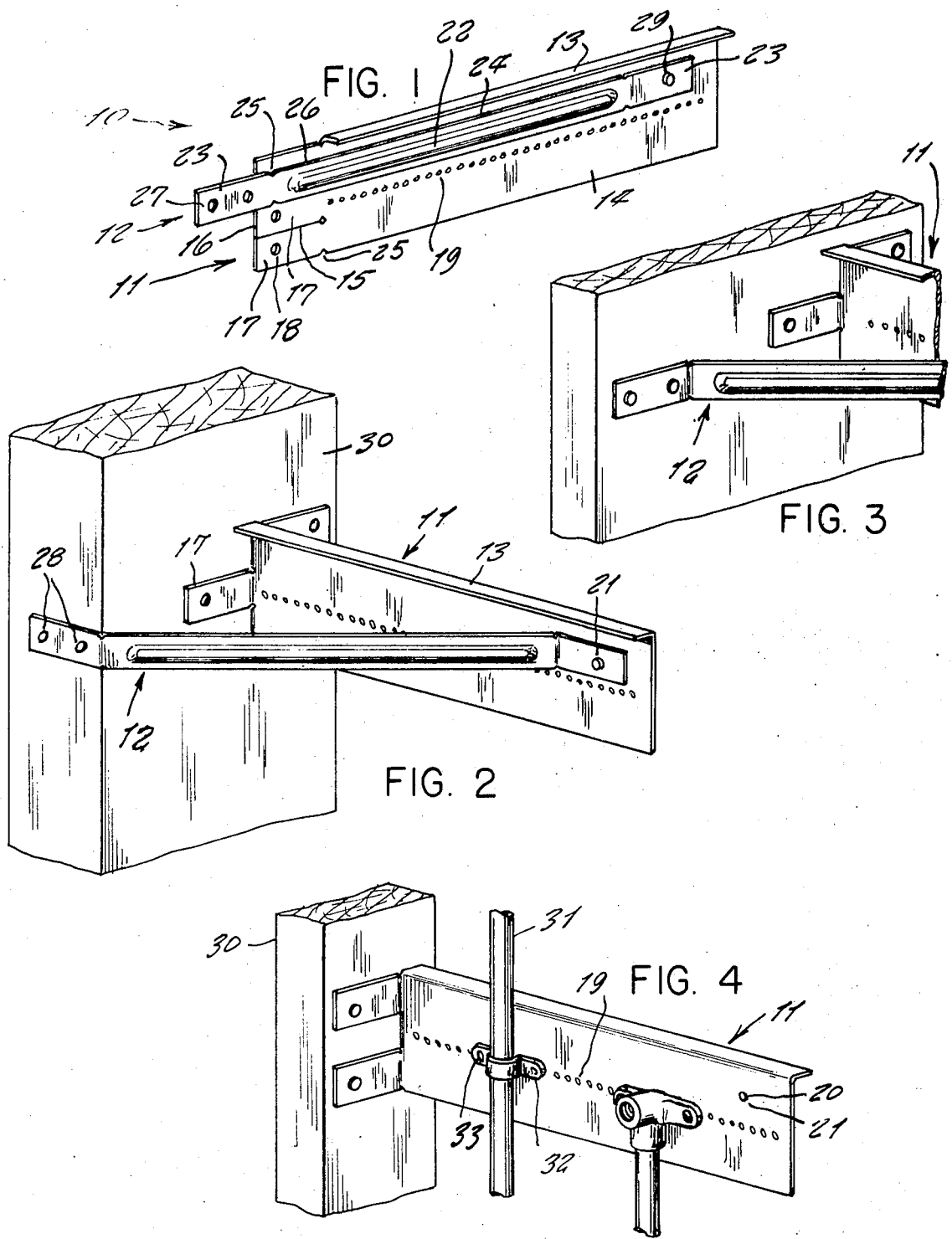

QUICK MOUNT

This invention relates generally to holding devices.

It is generally well known in the construction fields that very often there is a need for a quick and ready holding device for supporting plumbing pipes in a building construction.

Accordingly it is the principal object of the present invention to provide a quick mount that is particularly adaptable for the mounting of geared ells and riser pipes such as are used in the plumbing trade and which are installed within a building construction.

Another object of the present invention is to provide a quick mount which can be readily set up in a quick manner.

Yet another object of the present invention is to provide a quick mount which has been found acceptable for use in the electrical trade for mounting of switch and outlet boxes, motor starters and distribution panels.

Still another object of the present invention is to provide a quick mount which is readily adjustable to be variably mounted in different positions and against different construction components.

Other objects of the present invention are to provide a quick mount which is simple in design, inexpensive to manufacture, rugged in construction, easy to use and efficient in operation.

These and other objects will be readily evident upon a study of the following specification and the accompanying drawing wherein:

FIG. 1 is a perspective view of the mount as packaged,

FIG. 2 is a perspective view of the mount applied to a post on its front and side, FIG. 3 is a fractional, perspective view of the mount applied to a post front side alone, and FIG. 4 is a perspective view of an alternate form of mount, being the mirror image of the mount illustrated in FIG. 1 and shown in use supporting a conduit from a post.

Referring now to the drawing in detail, the reference numeral 10 represents a quick mount according to the present invention wherein the same is comprised of two steel metal straps 11 and 12 each one of which is made of flat galvanized strip and which is three dimensionally formed in a stamping operation.

The strap 11 is made from 0.028 inch thickness of material and measures 2¼ inches wide and 10 inches in length. Along one longitudinal edge thereof there is a flange 13 bent over at right angle to the remaining flat portion 14 thereof. The portion or panel 14 is of generally rectangular configuration and at its one longitudinal end is provided with two parallel slits 15 extending from an end edge 16 thereof so to form separate tabs 17 each one of which has a punched out opening 18 therethrough.

A straight row of perforated openings 19 extend centrally along the length of the panel 14, the panel 14 additionally having a singular opening 20 near its opposite longitudinal end so to receive a rivet 21.

It will now be apparent that the flange 13 gives rigidity and strength to the strap so to prevent the same to bend under a load. The material however is such that the tabs 17 can be independently bent over according to various mounting requirements.

The strap 12 is likewise made from a 0.028 inch thick material and which is three quarter inches wide by 10 inches in length. The intermediate major length of the strap 12 is provided with a formed dimple 22 that serves the same purpose as the flange on the other strap, namely to give rigidity to the strap and prevent the same from bending when under a load.

The opposite terminal end portions 23 thereof however are readily bendable respective to the intermediate portion 24 that contains the dimple, 22.

A notch 25 along each opposite edge 26 of the strap 12 separates the end portions 23 from the intermediate portion 24 so that the end portions 23 thus serve as tabs that can be selectively bent along a transverse bend line formed across the notches 25. Each of the tabs can be bent to a selected angle according to a requirement of any specific mounting purpose.

One of the tabs 23 is provided with a pair of openings 27 therethrough so to receive mounting nails 28. The opposite end tab 23 has an opening 29 therethrough and through which the rivet 21 extends, this end of the strap 12 accordingly being attached to the strap 11.

In operative use, it is now evident as shown in FIGS. 2 to 4, that the tab 23 can be bent into different directions and at varied amounts.

When the device is secured to a vertical stud 30 the quick mount forms a triangular structure with the stud for best strength in supporting any device.

As shown in FIGS. 3 and 4, the tabs 17 of the strap 11 can be bent into various directions so that the strap 11 can be used independently of the strap 12, such as in FIG. 4 wherein the strap 11 alone supports the conduits 31. Brackets 32 around the conduits are attachable to the strap 11 by means of screws 33 passed through the brackets 32 and through the perforated openings 19 of the strap 11.

Thus there is provided a quick mount.

What I now claim is:

1. In a quick mount, the combination of a pair of strap members, said strap members being made of formed sheet metal material, said straps being enjoined pivotally together at their one ends by means of a single rivet, a first said strap being relatively wider than the second of said straps, the first said strap having one longitudinal edge thereof provided with a bent over flange to give ridigity for preventing bending, said first strap having a plurality of tabs at one end thereof, said tabs being readily bendable into opposite directions from each other so that together they form a T-shaped head respective to a main body portion of the first said strap, said first strap having a longitudinal row of perforated openings there across, said perforated row of openings being aligned with a center of said tabs on the end of the first said strap, the second of said straps having a major intermediate portion thereof provided with a longitudinal extending dimple formed therein so to prevent bending of said second strap, the opposite ends of said second strap forming tabs that are readily bendable respective to said intermediate portion, one of said end tabs being provided with a plurality of openings for receiving mounting nails for securement to a construction stud or the like.

\* \* \* \* \*